Figure 3:
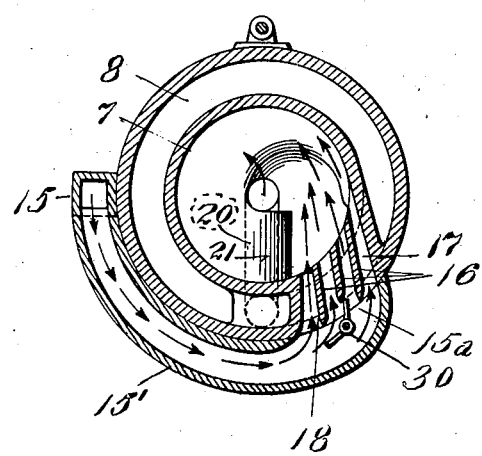

June 2, 1931. J. TANEYHILL 1,808,384
TWO-CYCLE ENGINE
Filed June 19, 1929 2 Sheets-Sheet 1
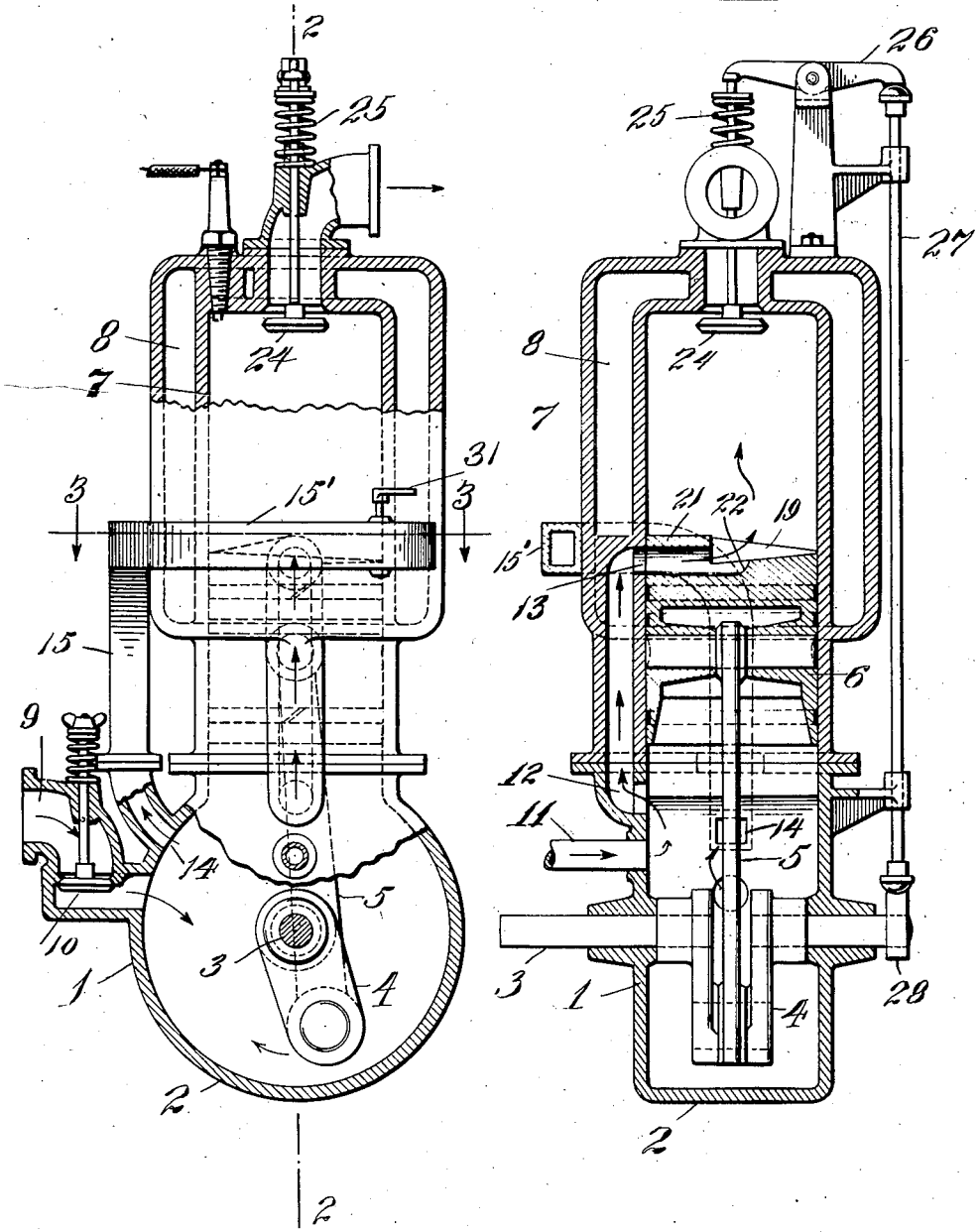
Inventor:
John Taneyhill,
by H. M. Plaisted,
His Attorney.

June 2, 1931.   J. TANEYHILL   1,808,384
TWO-CYCLE ENGINE
Filed June 19, 1929   2 Sheets-Sheet 2

Inventor
John Taneyhill,
By H.M. Plaisted
His Attorney.

Patented June 2, 1931

1,808,384

UNITED STATES PATENT OFFICE

JOHN TANEYHILL, OF ST. LOUIS, MISSOURI

TWO-CYCLE ENGINE

Application filed June 19, 1929. Serial No. 372,045.

This invention relates to certain new and useful improvements in two-cycle engines, the peculiarities of which will be hereinafter fully described and claimed.

The main objects of my invention are to avoid the mingling of the old burnt charge with the new incoming charge; secondly, relates to a secondary transfer or bypass adapted to deliver a rich fuel charge to the center of the piston and keep the core more or less from intermingling with the main charge until it is ready for ignition; thirdly, to produce a circular motion in the main charge entering the cylinder from the transfer manifold and the provision of means for delivering the charge to the cylinder in grouped tangential streams; fourthly, to cause the said combined streams as they circle around above the piston to rise somewhat so as to pass over the fuel stream entering from said bypass and avoid interference; fifthly, to vary the volume and direction of the main charge entering from the transfer manifold at the point where it leaves the manifold and passes into the cylinder, thereby changing said streams so that they are more or less tangential as may be desired; sixthly, to cause the charge from the main transfer to rise spirally next to the cylinder walls while the charge from the fuel bypass rises on the inside of said whirling, ascending, surrounding cloak of the main charge filling the cylinder; seventhly, to provide means for closing the exhaust at the top of the cylinder at a predetermined point of rotation of the crank, preferably about 25 degrees beyond the lower dead center; eighthly, to provide a deflector adapted at low speed to send a stream through a passage nearer the center, and at a high speed the deflector is adjusted to deflect the streams through the multiple passages that are more tangential and thus cause a greater whirling motion about the fuel core; and ninthly, to obtain by the whirling action of the air entering tangentially, a certain amount of suction created which assists in drawing in the fuel from the bypass communicating with the crank case below.

In the usual construction of two-cycle engines, the inlet and exhaust ports are opposite each other near the bottom of the stroke of the piston. When they are opened and the flaming gas is allowed to pass out of the exhaust port, the new charge entering by the inlet port is more or less mixed with the lagging portions of the burnt charge. Usually a deflector plate on top of the piston opposite the inlet port, is used to deflect upward the new charge, but still part of the old charge will remain intermixed with the new charge when the exhaust port closes.

My construction is intended practically to eliminate this intermixture of the lagging portion of the burnt charge with the entering new charge, by changing the location of the exhaust port from the side to the top of the cylinder, and induce a spirally ascending cloak next to the cylinder walls and enclosing a rich core of fuel gas delivered to the center of the cylinder, which core is adapted to be spread out near the top of the cylinder and then intermixed with the enclosing cloak of air to form the new charge being compressed by the ascending piston.

Also I propose to vary the whirling velocity of the enclosing air charge by causing it to enter from the air port more or less tangentially to adapt it for high speed or low speed engines accordingly. Other novel points of construction and operation will appear later.

Figure 4:
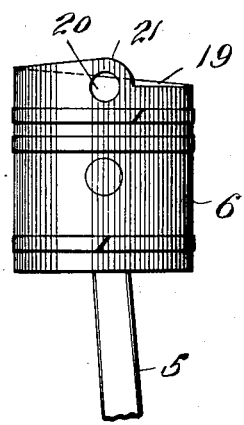
Figure 5:
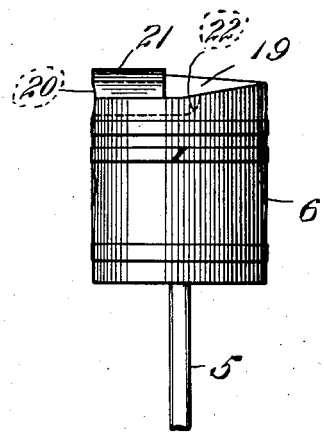

In the accompanying drawings on which like reference numerals indicate corresponding parts, Fig. 1 represents a side elevation, partly in section, of a two-cycle engine embodying my invention;

Fig 2, a central sectional elevation on the line 2—2 of Fig. 1;

Fig. 3, a horizontal section on the line 3—3 of Fig. 1;

Fig. 4, a side elevation of my improved piston on the side showing the passage adapted to communicate with the fuel inlet;

Fig. 5, a similar view with the wall of said passage in section and showing the spiral face of the piston ascending so as to pass over said passage.

Referring to the drawings, the numeral 1 designates a crank casing and 2 the engine base. In said casing is mounted a shaft 3 having a crank 4 operatively connected by a rod 5 with a piston 6 in a cylinder 7 provided with the usual water jacket 8 or other cooling means.

The crank case has an air inlet 9 controlled by an automatic valve 10 opening inward, adapted to deliver to the crank case by the suction of the rising piston, the main charge of air.

The usual or approved carburetor supplies gas fuel through a pipe 11 to said crank case, and walls form a gas fuel passage 12 from the crank case upward to a fuel inlet port 13. Said pipe 11 where it enters the vertical end wall of crank case is adjacent to the lower end of said passage 12 (Fig. 2), to facilitate transfer of the gas from the pipe 11 to the gas inlet port 13.

Preferably adjacent to the air inlet valve is located in the curved side wall of the crank case the lower end of a transfer passage 14 (Fig. 1) formed by walls that extend vertically upward at 15, and then turn horizontally around the cylinder in substantially the same plane as an air inlet port 15a, adjacent to the fuel inlet port 13. This port 15a is divided by vertical partitions 16 into multiple passages that vary in their tangential relation to the bore of the cylinder as shown in Fig. 3. Thus the outer passage 17 is practically tangent to the bore of the cylinder, while the passage 18 is directed more towards the center of the piston; and the interposed passages vary accordingly.

The end of the revolving crank passes directly in front of the air outlet 14 which is above the air inlet from the air valve 10, and tends to sweep the entering air into said outlet as it rotates upward as indicated in Fig. 1. The fuel gas entering the space between the vertical end wall and the crank is less subject to the blower action of the crank, and although some gas is mixed with the air in the crank case, the main charge of fuel gas passes in a rich mixture up the fuel passage 12 to the port 13 connecting with the tubular passage 19 in the piston head when the latter is in its lowest position. The upcurved end of said passage 19 directs said richer mixture upward in the center of the cylinder in the comparatively quiet vortex of the whirling cloak of the air mixture that has entered tangentially through the inlet 15a located at a point in the cylinder wall opposite the bottom of the spiral on the piston. This entering air current combined in the cylinder from the directing passages of the inlet port, sweeps tangentially around the inner wall of the cylinder and rises on said spiral surface so that it passes over the tubular fuel passage and also above the said air current entering through said cylinder port 15a, and spirals upward against the cylinder walls with undiminished velocity. By avoiding interference with the main entering current its whirling motion thus provides the vortex for the richer fuel mixture to ascend in the comparative quiescence of said vortex. This central upward current of fuel gas is gradually acted on in its ascent by the whirling cloak of air mixture which causes the richer fuel current to spread out and join the upward whirling motion of the former, so that they are quite thoroughly intermingled when both reach the top of the cylinder. In other words, the port 15a acts as a nozzle to deliver tangentially at one portion of the cylinder and at the bottom of the spiral top of the piston, such a strong current of air mixture that it forms said whirling cloak and vortex for the richer central core of gas, so that thorough intermingling is retarded till both arrive at the top of the cylinder. They are compressed by the next upward stroke of the piston and ignited to provide the downward power stroke of the piston. This action is produced by my form of piston top, the spiral surface of which is formed about the central axis of the piston and the lower portion of the spiral starts from a side portion of the piston that is adapted to cooperate at the bottom of its stroke with the inlet port 15a, and to lift said current by the upper portion of said spiral so that as it whirls around spirally upward, and arrives at said inlet portion, it is traveling in a higher plane and thus passes over the entering air current without interference therewith. The tubular radial passage 19 is at the same time admitting a richer fuel mixture from the cooperating inlet port 13 of the cylinder, and is directing said richer mixture upward in the center of the cylinder and in the vortex of said spirally ascending air mixture.

I preferably provide also a pivoted deflector 30 mounted opposite said partitions and having wings adapted to cover alternately two or more of the multiple passages by contact with adjacent partitions as shown in Fig. 3. Thus when the deflector is adjusted as shown in this figure, all of the passages receive their proportionate amount of air from the transfer passage; when the wings are adjusted to cover the intermediate passages the incoming air is delivered more tangentially to the cylinder. A handle 31 (Fig. 1) allows of adjustment by hand or otherwise of said deflector as may be desired.

The walls 15' forming the circumferential portion of said transfer passage are gradually curved as shown in Fig. 3 to produce the tangential relation of the inlet port to the cylinder bore as above described.

The upper face of said piston is formed in a gradually ascending spiral 19 (Figs. 4 and 5), with the beginning of the spiral located so as to receive the air charge from said inlet port and cause it to rise as it circles around adjacent to the cylinder walls. A tubular passage 20 extending radially inward towards the center of said spiral face is formed by the portion 21 of said spiral passing over said passage. The central portion of the passage is turned upward by a curved shoulder at 22 to direct the incoming fuel charge upward in the center of the cylinder as indicated in Fig. 2. The fuel core is thus delivered upward without spiral motion, while the air charge that enters by the air port tangentially, encloses it and ascends with it. The said fuel core therefore is delivered to and ascends in the vortex of the swirling spirally ascending air. When both reach the top of the cylinder, they are spread out and intermixed to form the new charge ready for compression and ignition upon the upper stroke of said piston. By this retarding of the mixture of fuel gas and swirling cloak of air till they reach the upper end of the cylinder, the danger of premature ignition is greatly lessened, especially in a high compression engine.

The exhaust valve 24 is operatively mounted in the top of the cylinder and provided with a spring 25 and lever 26 actuated through a trip rod 27 that engages a cam 28 on said shaft 3. This upper location of the exhaust port combined with the swirling ascending air and central fuel core allows practically all the burnt charge to leave the cylinder before the valve closes, and this avoids intermixture of the lagging portions of said burnt charge with the fresh charge before described. Much greater explosive effect and power developed is thus obtained by my construction above described.

Since the center or vortex of the cyclonic air charge is quiescent, the fuel core delivered to said vortex by the tubular passage in the piston is little affected by the whirling air charge as the fuel core ascends. Thus the fuel core is not materially mixed with the enclosing air charge until both arrive at the upper end of the cylinder where the intermixture takes place by the fuel core spreading out under the exhaust valve, which by that time has been closed by its operative trip rod and lever under the tension of the spring 25. This method of handling and mixing the air and gas at the top of the cylinder (instead of the usual way), facilitates ignition at the most favorable time of compression and increases the efficiency of the exploding charge as above mentioned.

I claim:

1. In an internal combustion engine, a piston having its upper surface formed in an ascending spiral starting from one lower portion at its side and rising in a spiral plane about its central axis and having a radial passage formed in the upper portion of the piston to discharge centrally the entering fuel mixture delivered to said passage and the upper portion of said spiral plane extending over said passage to avoid interference with tangentially entering air currents delivered to the bottom of said spiral, substantially as described.

2. In an internal combustion engine, a piston having its top formed by one turn of a rising spiral about a central axis to guide air currents delivered tangentially to the bottom of the spiral, the top of the spiral having a tubular passage radially disposed from its inlet in the cylindrical side of the piston and curved upward at its outlet in the center of the piston to deliver upward a fuel mixture at the center of said spiral top, substantially as described.

3. An internal combustion engine comprising a vertical cylinder having an exhaust valve at the top and a tangential air inlet port near the bottom at one portion of its wall for admitting air mixture, and having a fuel inlet port near the bottom for admitting a richer fuel mixture, and a piston operatively mounted in said cylinder and having a top formed in a rising spiral about the central axis, the bottom of said spiral at the bottom of the stroke communicating with said tangential air inlet port, and the upper portion of said spiral having a tubular radial passage extending from its inlet end in the cylindrical side of the piston towards the axis and curved upward at its central outlet, and its inlet end at the bottom of the stroke communicating with said fuel inlet port to deliver a richer fuel mixture in the center of the cylinder and in the vortex of the whirling air mixture, substantially as described.

In testimony whereof I have affixed my signature.

JOHN TANEYHILL.